(12) United States Patent
Yang et al.

(10) Patent No.: US 10,372,111 B2
(45) Date of Patent: Aug. 6, 2019

(54) VIRTUALIZATION-BASED NUMERICAL CONTROL SYSTEM AND METHOD THEREOF

(71) Applicant: HUAZHONG UNIVERSITY OF SCIENCE AND TECHNOLOGY, Wuhan, Hubei (CN)

(72) Inventors: Jianzhong Yang, Hubei (CN); Bingyan Feng, Hubei (CN); Enming Hui, Hubei (CN); Guotao Ding, Hubei (CN); Yongliang Lu, Hubei (CN)

(73) Assignee: HUAZHONG UNIVERSITY OF SCIENCE AND TECHNOLOGY, Wuhan, Hubei (CN)

( * ) Notice: Subject to any disclaimer, the term of this patent is extended or adjusted under 35 U.S.C. 154(b) by 408 days.

(21) Appl. No.: 15/109,277

(22) PCT Filed: Jun. 12, 2015

(86) PCT No.: PCT/CN2015/081291
§ 371 (c)(1),
(2) Date: Jun. 30, 2016

(87) PCT Pub. No.: WO2016/045414
PCT Pub. Date: Mar. 31, 2016

(65) Prior Publication Data
US 2016/0327939 A1    Nov. 10, 2016

(30) Foreign Application Priority Data
Sep. 26, 2014    (CN) .......................... 2014 1 0505694

(51) Int. Cl.
*G05B 19/414*    (2006.01)
*G05B 15/02*    (2006.01)

(52) U.S. Cl.
CPC ........... *G05B 19/414* (2013.01); *G05B 15/02* (2013.01)

(58) Field of Classification Search
CPC ........................... G05B 19/409; G05B 19/414
See application file for complete search history.

(56) References Cited

U.S. PATENT DOCUMENTS

| 2004/0254648 | A1  | 12/2004 | Johnson et al. |
| 2007/0129826 | A1* | 6/2007  | Kreidler ............. G05B 19/4183 700/83 |
| 2015/0185727 | A1* | 7/2015  | Shi ........................ G05B 19/418 700/96 |

FOREIGN PATENT DOCUMENTS

| CN | 101164026 | 4/2008 |
| CN | 101802732 | 8/2010 |

(Continued)

OTHER PUBLICATIONS

International Search Report for international application No. PCT/CN2015/081291, dated Sep. 15, 2015 (6 pages, including English translation).

*Primary Examiner* — Mark A Connolly
(74) *Attorney, Agent, or Firm* — Hamre, Schumann, Mueller & Larson, P.C.

(57) ABSTRACT

Disclosed is a numerical control system, comprising a local NC device and a remote server connected therewith, and the remote server operates to process non-real-time tasks, comprising G code programming, coding and machining simulation, and to realize value-added functions. The server is connected with the NC device via a client disposed on the NC device, and the client operates to conduct virtual operation on the remote server via a HMI of the local NC device by using virtualization technology, thereby controlling operation on the server on the local NC device, and controlling NC machining by cooperation of the server and the (Continued)

local NC device. The invention also discloses a control method for the system. The invention is capable of realizing diversified, elastic and individual function configuration of the whole numerical control system, and improves the machining efficiency of the numerical control system.

10 Claims, 4 Drawing Sheets

(56) References Cited

FOREIGN PATENT DOCUMENTS

| CN | 102077171 | 5/2011 |
| CN | 102736553 | 10/2012 |
| CN | 104298175 | 1/2015 |

* cited by examiner

VIRTUALIZATION-BASED NUMERICAL CONTROL SYSTEM AND METHOD THEREOF

FIELD OF THE INVENTION

The invention relates to the field of numerical control systems, and more particularly, to a virtualization-based numerical control system and a method thereof.

BACKGROUND OF THE INVENTION

As a flexible, high-efficiency and high-precision automatic machine tool, a numerical control (NC) machine tool can comparatively well solve complex, precise, small-amount or multi-type machining problems, and is generally composed of a numerical control system, a main body and other auxiliary devices. The numerical control system being a core of the whole NC machine tool is capable of integrating position (trajectory) control, speed control and torque control altogether, executing parts of or whole numerical control functions according to code instructions, and realizing motion control of one or more machineries. As shown in FIG. 1, a numerical control system normally includes an input/output device, a NC device, a programmable logic controller (PLC), a servo system, a detection and feedback device and the like, amongst which the NC device is a hard core of the numerical control system.

The NC device may include a display module, an input/output module, a decoder, a motion planner, an axis motion controller, a memory and the like. The display module is an important medium for human-machine interaction, and provides a visual operation environment for users. The input/output module is a port for data and information exchange between the NC device and an external device, and is mainly used for inputting data such as NC machining programs, control parameters, compensation quantities and the like, and for outputting information such as servo drive, trajectory control and the like. The decoder is mainly used for decoding program segments of the NC machining program. The motion planner mainly facilitates speed processing and interpolation operation. The axis motion controller is an interface module between the NC device and a servo drive system and operates for position control. The memory is used for storing information such as machining programs, system configuration parameters, system inherent data and the like.

At present, functions of the numerical control system are required to be flexibly expanded, and a conventional NC system normally employs an architecture formed by a personal computer as an upper computer, as well as a NC as a lower computer, as shown in FIG. 2, the upper computer and the lower computer are both disposed in the vicinity of a machine tool and connected to each other via a bus. The upper computer (PC) is an HMI for handling non-real-time tasks of the system, and the lower computer (NC) comprises a NCU and a PLC both for handling real-time tasks of the system, such as motion control and logic control. The numerical control system possesses a distributed characteristic, and partly supports secondary research and development by users and independent upgrading. Moreover, a control end of the system as well as the PC end of the system are open, and communication between the upper-computer and the lower-computer, and control thereof can be easily realized and maintained.

However, with increasing demand for intelligence and multi-functionalization of the numerical control system, requirement for hardware thereof becomes much higher. Particularly, as functions of NC-related software, such as Computer-Aided Design (CAD), Computer-Aided Manufacturing (CAM), Computer Aided Process Planning (CAPP), Computer-Aided Engineering (CAE), Product Lifecycle Management (PLM), Manufacturing Execution System (MES), Enterprise Resource Planning (ERP) and the like become much more powerful than before, more and more computer resource for running the software is needed, and correspondingly, there is much higher requirement for a kernel and a memory of the numerical control system. If the requirement for intelligence and multi-functionalization of the numerical control system is met at the cost of continually upgrading software and hardware thereof, on the one hand, cost on design, manufacturing, upgrading and use thereof may be significantly raised, and difficulty in testing, development and production thereof may be increased, and on the other hand, the numerical control system may become bloated, complex and unreliable. Additionally, functional parts of the numerical control system under this architecture and other numerical control systems are mutually independent, this architecture with completely opened interior and relatively closed exterior cannot meet requirement for an external equipment or software and expanding functionality thereof. Furthermore, this architecture forms a local resource island, resulting in poor compatibility between the numerical control system and the external equipment or software, and thus partly restricting multi-functionalization of the numerical control system.

At present, the numerical control system having the above-mentioned architecture makes it difficult for intelligence thereof to adapt to increasingly complex manufacture process, and thus becoming a main bottleneck during development of the numerical control system towards intelligence digitalization and multi-functionalization.

SUMMARY OF THE INVENTION

In view of the above-mentioned problems, it is an objective of the invention to provide a virtualization-based numerical control system and a method thereof that are capable of facilitating high sharing of numerical control resources in workshops, and enabling the NC system to be adapted to development of intelligence and multi-functionalization by integrating virtual desktop on a local NC device, transferring function expanding and development tasks of the NC system to a remote server, and realizing high value-added functions that are not supported by the local NC device via interaction between the remote server and the local NC device.

In accordance with an aspect of the invention, provided is a virtualization-based numerical control system for controlling NC machining by configuring a remote server and a local NC device and facilitating interaction thereof, the numerical control system comprising:

a local NC device operating to process real-time tasks, comprising speed processing, interpolation operation, position control and on-line detection, and to realize human-computer interaction; and a remote server connected with the local NC device, the remote server operating to process non-real-time tasks, comprising G code programming, coding and machining simulation, and to realize value-added function, comprising one or more of document editing or document viewing, Internet browsing, WinSCP file transfer, NC code quality analysis and detection, and NC code spline fitting and optimization;

the remote server is connected with the local NC device via a client disposed on the local NC device, and the client operates to conduct virtual operation on the remote server via a human-machine interactive device of the local NC device by using virtualization technology, thereby controlling the remote server on the local NC device, and facilitating NC machining control by cooperation of the remote server and the local NC device.

In a class of this embodiment, the process of conducting virtual operation on the remote server via a human-machine interactive device by the client comprises: transmitting an operation interface image corresponding to the remote server to an HMI interface, transmitting operation on the operation interface to the remote server in an instruction manner, and transmitting the result to the HMI interface for updating and displaying after the remote server responds, thereby facilitating localization operation of the remote server.

In a class of this embodiment, the process of transmitting and displaying the operation interface image comprises firstly compressing the operation interface image, then transmitting the compressed image to the local NC device based on TCP/IP protocol, and decompressing the compressed image and finally refreshing the HMI interface according to the decompressed image by the local NC device receiving the decompressed image.

In a class of this embodiment, the remote server is a server/PC, a virtual machine running on the server/PC, even a tablet computer or the like.

In a class of this embodiment, the remote server can be connected with a plurality of local NC devices for interaction, NC machining and/or resource sharing.

In a class of this embodiment, software or functions of the remote server can be expanded, cut down and/or configured through the client disposed on the local NC device.

In a class of this embodiment, the client is self-adaptive to different screens, and the interface resolution is automatically adjustable according to the screen size of the HMI interface.

The invention constructs a new virtual-desktop-based numerical control system via virtualization technology, converts the numerical control system's requirement for local software and hardware resources into that for the server, and facilitates flexible expansion, cut down, optimization and configuration of the numerical control system at the server without changing or even reducing software and hardware configuration thereof, thereby enabling application of intelligent functional software to be not restricted by local resource, realizing high sharing of resources, simplifying the local NC device, substantially reducing production cost, as well as improving reliability of the numerical control system.

In the present invention, by setting up a server environment for a local NC device, deploying a local thin client on the NC device, and logging on the server from the client, it is possible for an operator to access to the server on a human-machine interface (HMI) of the NC device. As the server provides application service behind the scenes, the operator can directly operate the server via the HMI interface of the NC device without being aware of existence of the server as if all operations are conducted at the local NC device, and thus localization of remote operation is facilitated.

In the numerical control system of the invention that facilitates localization of remote operation, the server operates to install, configure and run commercial software such as CAPP, CAD/CAM, CAE, PLM, MES, ERP and so on, to expand any functional software such as value added functions, such as document editing or document viewing, Software-Unigraphics (UG), simulation numerical control machining, WinSCP and the like (as long as the software and hardware resource of the server can provide related support thereto), and to provide other functions to the local NC device, including but not limited to quality analysis and optimization of intelligent G codes, spline fitting and fairing of the G codes, quality analysis and detection of instruction domain codes, value added functions, such as document editing or document viewing, Internet browsing and the like.

In the present invention, original non-real-time functions with large memory space, high upgrading frequency or high computation (such as coding, machine tool's anti-collision simulation and the like) of the NC device can be transferred to the server, so that upgrading of functional software is not restricted by local resources, and the local device is simplified, production cost is reduced, and reliability of the numerical control system is raised, meanwhile a calculation speed and precision of the NC device are improved.

Preferably, certain authority for distributing or operating the server's software can be assigned to a user, and thus allowing the user to flexibly expand, cut down or configure the software as required, thereby facilitating personalization, flexibility and functional diversification during configuration of the whole numerical control system.

The client disposed at the local NC device reduces numerical control system's requirement for a CPU, a memory, a hard disk's storage space and the like of the local NC device, and becomes a link for information exchange between the local NC device and the server. An operator can freely switch on or off the client without influencing normal operation of the local NC device. The client is self-adaptive to different screens, and an interface resolution thereof is automatically adjustable according to a screen size of the local HMI interface.

Communication between the NC device and the server employs a data lightweight technology, which reduces dependence of real-time information exchange on a network bandwidth.

To summarize, the present invention comprises the following advantages over the prior art:

(1) the NC system of the invention employs the server and the local client, and is capable of transferring non-real-time functions and function expanding and development tasks of the NC device to the server, as well as realizing high-value added functions that are not supported by the local NC device via remote interaction.

(2) the above-mentioned architecture is capable of facilitating information sharing and distribution between functional parts of the numerical control system and other numerical control systems and substantially improving the information utilization rate and the compatibility between the numerical control system and an external equipment or software.

(3) based on the virtualization technology, the client is disposed on the NC device for accessing the server and facilitating local NC operation through simulation, thereby improving the processing performance of the numerical control system and meeting equipment/software requirement for expanding functions while controlling NC machining.

(4) the employed virtualization technology breaks the local resource island formed by the numerical control system, and solves the problem that a conventional numerical control system seriously restricts development of the numerical control system towards intelligence and multi-functionalization.

DESCRIPTION OF ACCOMPANYING DRAWINGS

SPECIFIC EMBODIMENT OF THE INVENTION

Figure 1:
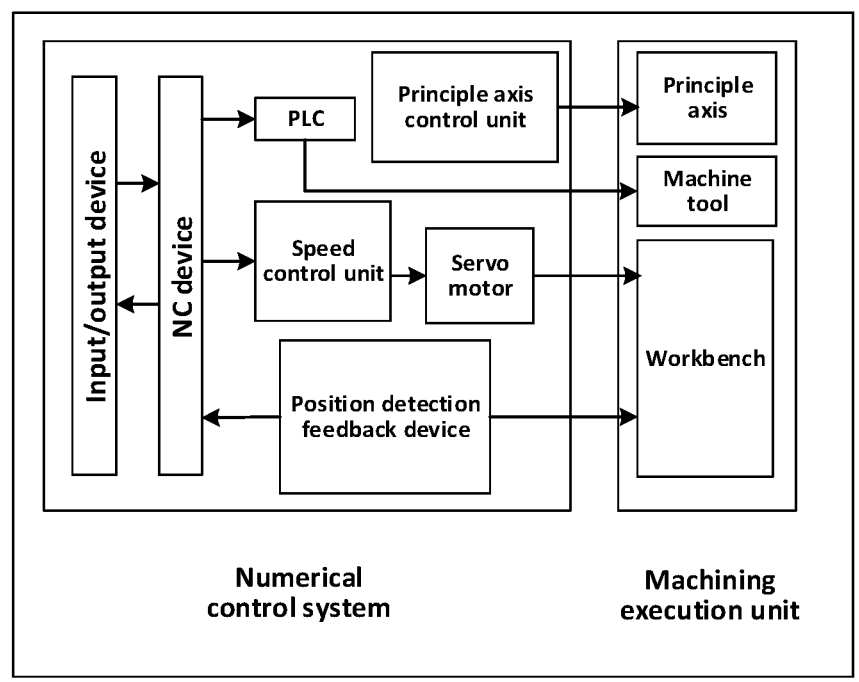
FIG. 1 illustrates an architecture of a numerical control system in the prior art.
Figure 2:
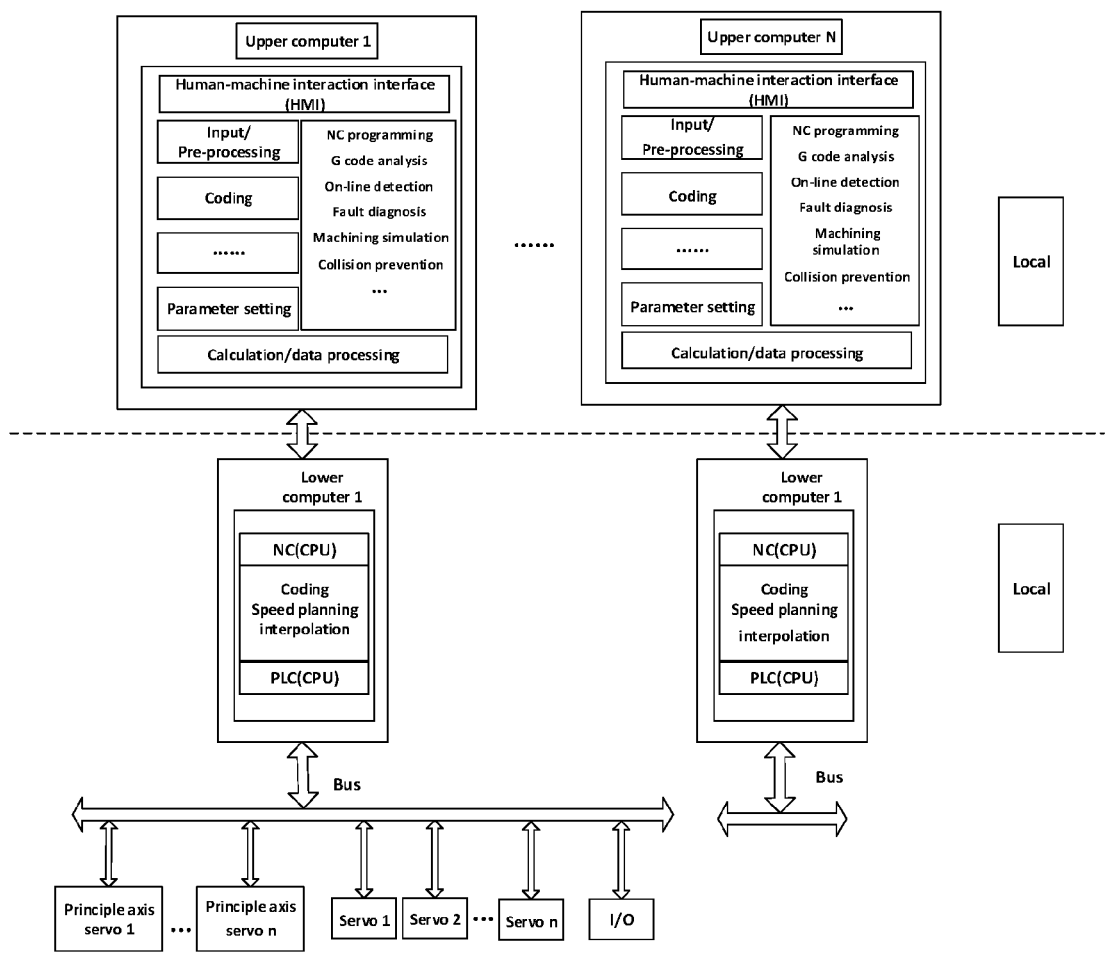
FIG. 2 illustrates an architecture of a conventional numerical control system, the architecture comprising an upper computer and a lower computer, the upper computer being a HMI for handling non-real-time tasks of the system, and the lower computer comprising a NCU and a PLC for handling real-time tasks of the system such as motion control and logic control.

For clear understanding of the objectives, technical scheme and advantages of the invention, detailed description of the invention will be given below in conjunction with accompanying drawings and specific embodiments. It should be noted that the embodiments are only meant to explain the invention, and not to limit the scope of the invention.

Virtualization technology has been extensively used. Desktop virtualization provides a calculation module based on a server, means virtualizing the desktop of a computer or a virtual machine thereof for facilitating a user to access the desktop system on network through any terminal devices without being restricted by place and time, and is a fastest-growing most-promising technology in computer virtualization technology. In recent years, the virtual desktop system is gradually applied to various fields and is especially most extensively used in education, finance and other industries. Desktop virtualization technology is capable of transferring a traditional static calculation mode to a dynamic flexible expandable architecture which can easily respond to changes in business demands, and also substantially saving cost. Virtualization technology, particularly desktop virtualization technology in the digital NC machining field will more greatly promote development of numerical control technology towards high intelligence.

However, because of real-time property, on-site property, stability, reliability, specificity for hardware and software and other characteristics of NC machining, virtual desktop cannot be directly applied to the NC machining field and gets with many technological difficulties when being applied to the NC machining field.

Firstly, direct exploitation of virtual desktop on an NC device operation system easily influences the reliability and the stability of the whole numerical control system and increases failure rate of the numerical control system, which is the maximum bottleneck for extensively applying virtual desktop to an NC device. Secondly, frequent refreshing of virtual desktop interface will occupy limited internal memory, calculation resource and other resources of the numerical control system and correspondingly indirectly influences normal machining and machining efficiency of the numerical control system. Thirdly, refreshing of virtual desktop relates to transmission of real-time image data between the server and the client and indirectly influences rate of uploading, acquisition and the like for NC machining data because the transmission manner of real-time image data will occupy great workshop bandwidth. Finally, free switch between the NC machining interface and the virtual desktop and seamless integration of simultaneously-running NC machining and virtual desktop are problems for introducing virtual desktop technology to the NC field.

The provided method for facilitating function expanding of the numerical control system based on virtualization technology facilitates seamless integration of the NC device and the virtual desktop by employing Qt and frame buffer technology, substantially reduces occupation rate of virtual desktop refreshing on numerical control system CPU, and guarantees the stability and the reliability of the numerical control system. The lightweight technology is employed for transmitting real-time image data and reduces dependence of real-time image data transmission on workshop network bandwidth.

The invention employs the architecture combining the client with the server. The server is a server/PC, a virtual machine running on the server/PC, even a tablet computer or the like, and provides application service for the local NC device. The client is the local NC device and asks the server for application service. The local thin client is employed as a communication link between the server and the NC device, is essentially an application program integrated on the NC device operation system, and correspondingly has low requirements for hardware and software resources of the numerical control system, can be directly started and run without being installed, and does not influence the stability and the reliability of the NC device operation system. The client e only occupies very little memory and calculation resources of the numerical control system by employing frame buffer technology, facilitates localization of remote operation by opening and operating the remote virtual desktop on the NC device via the client, and breaks restriction of graphical desktop and guarantees the NC device operation system to normally run whether there is graphic desktop. In order to reduce information/data exchange requirement for network bandwidth, the invention preferably employs the data lightweight technology.

By employing the virtualization-based numerical control system function expanding method according to the embodiment in the invention, an operator can flexibly expand, cut down and configure functional software that are not supported by the local NC device at the server, breaks restriction on function diversification by the conventional numerical control system architecture, and also can transfer non-real-time tasks of the local NC device, which needs complex calculation and high memory requirement, to the server, thereby simplifying the local NC device, reducing enterprise production cost and reducing numerical control system testing difficulty.

Figure 3:
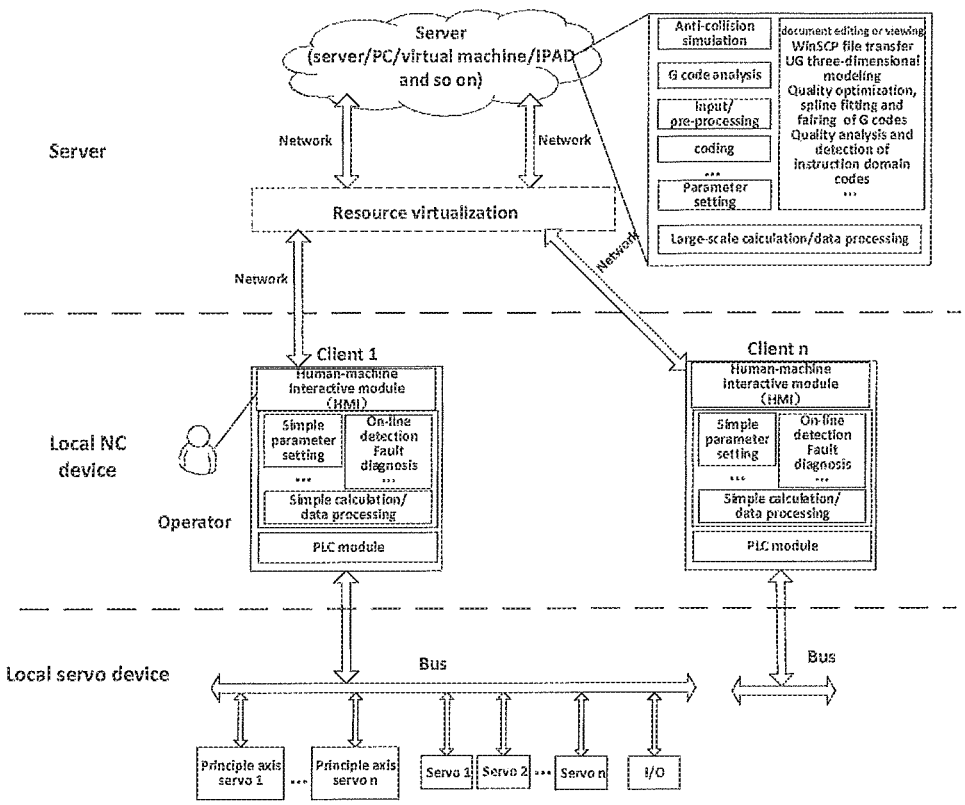
FIG. 3 illustrates an architecture of a virtualization-based numerical control system according to an exemplary embodiment of the invention.

A typical mode provided by the embodiment is shown as FIG. 3, the NC device is only used for handling human-machine interaction and real-time tasks such as speed processing, interpolation operation, position control, on-line detection and the like, and the server is used for high value-added functions which are needed by the numerical control system but are not supported by the local NC device, such as value added functions, such as document editing or document viewing, Internet browsing, WinSCP file transfer, NC code quality analysis and detection, NC code spline fitting and optimization, and the like, and also is used for original G code programming, coding, machining simulation and other non-real-time tasks of the NC device. The NC device is communicated with the server via the local thin client disposed on the NC device. By default the client is closed, and when the numerical control system needs complex/value-added functions of the server, the client is opened through a button on the panel of the NC device for remotely accessing the server, then system desktop information of the server is obtained after authentication by the server and is redrawn on the HMI in a virtual desktop manner, and through the virtual desktop, operations of expanding, cutting down and optimally configuring functions of the numerical control system and operations on high value-added software at the server can be performed, as shown in FIG. 3.

Figure 5:
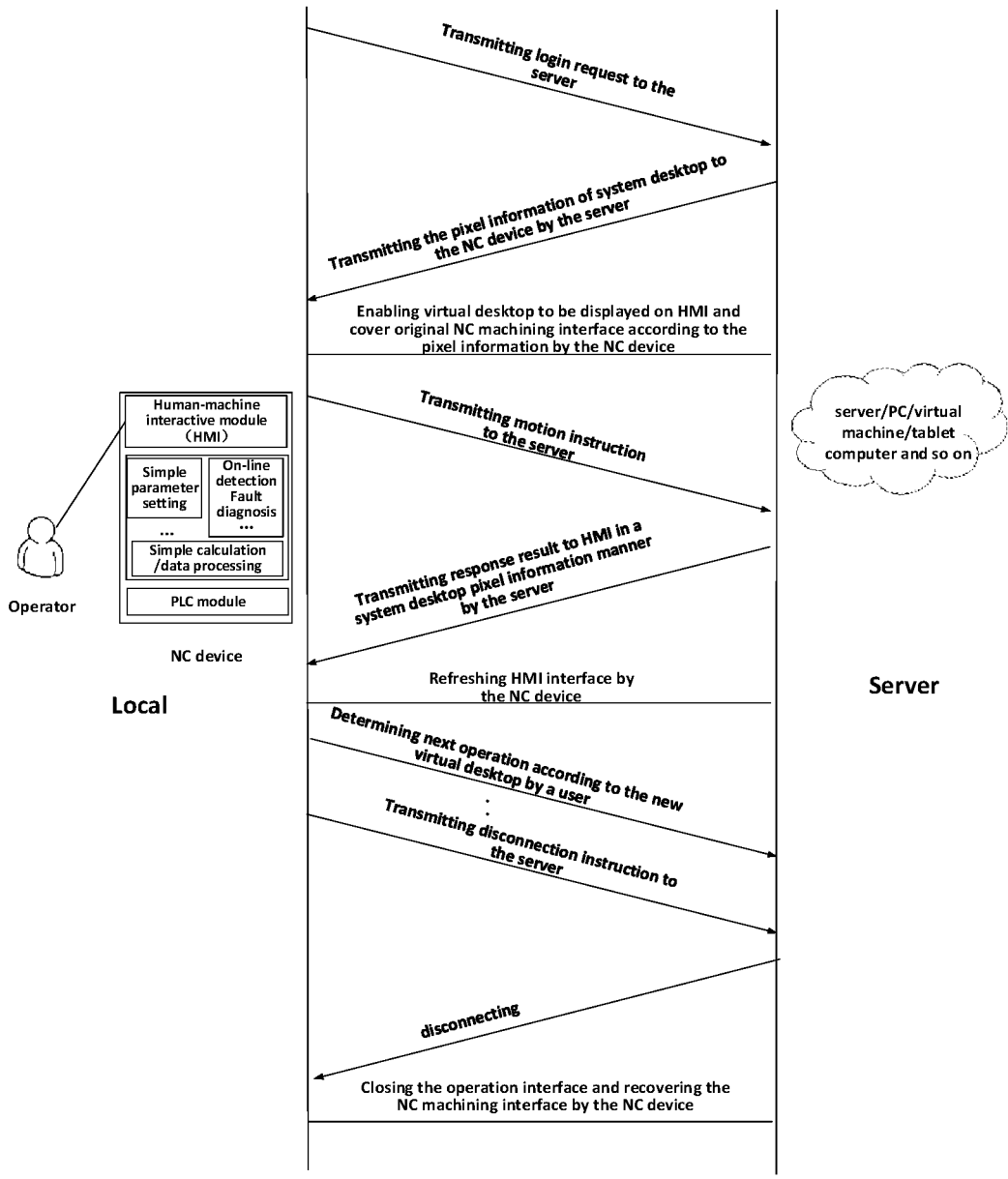
FIG. 5 is a flowchart illustrating a process of operating a virtual desktop of the server at a local HMI via the virtualization-based numerical control system of the invention.

When the server needs remotely operating, a login request instruction is sent to the server by the NC device via the thin client, the server transmits the system desktop thereof to the NC device after receiving the login request and enables the system desktop to be displayed on HMI (and to cover the NC machining interface), and thus an operator can operate the server via the virtual desktop. Operation and response on the virtual desktop are realized on the local NC device, which is not different from traditional NC operation superficially. However, actually what an operator operates on HMI is a picture, which is a screen copy of the server system desktop. Operation on the picture is sent to the server via an instruction manner, the server makes corresponding motion response according to the instruction and transmits the response result to the NC device in a pixel information manner, and the NC device timely updates the virtual desktop on HMI. A typical data exchange flowchart is shown as FIG. 5.

In summary, real-time image data transmission occurs between the NC device and the server. Generally, a commercial local area network with the conventional bandwidth is enough to deal with data transmission related to numerical control, but transmission of real-time image data raises higher requirement for network bandwidth. In order to solve the above-mentioned problem, the data lightweight technology is employed for transmitting real-time image data and concretely comprises that the server compresses image (that is system desktop) data and transmits compressed image data to the NC device, and after receiving the image data, the NC device firstly decompresses the image data and refreshes the HMI interface according to the decompressed image data. The data lightweight technology helps to reduce dependence of real-time image data transmission on network bandwidth, and enables a common commercial local area network with the conventional bandwidth to be capable of meeting the invention requirements.

Figure 4:
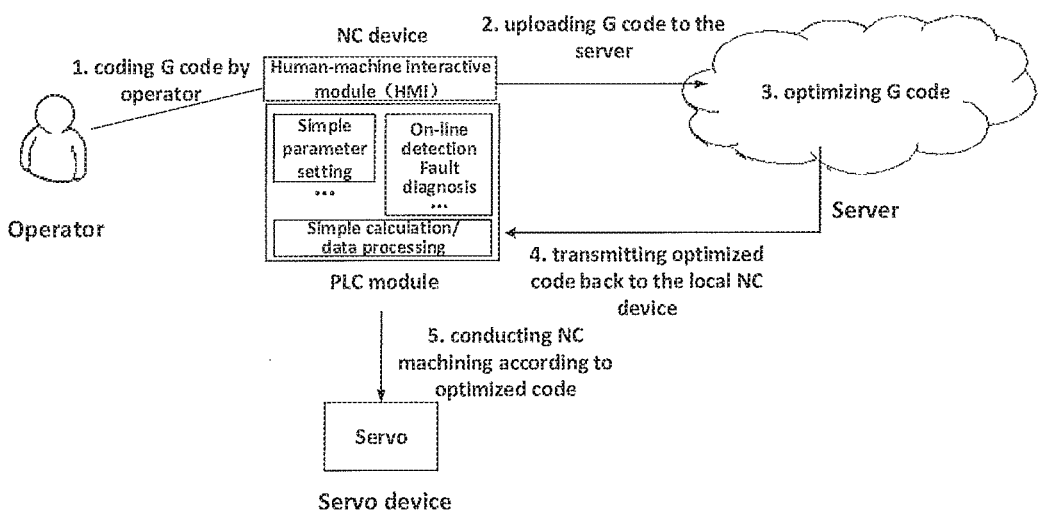
FIG. 4 is a flowchart illustrating interaction (taking G code optimization as an example) between a local NC device and a server of the virtualization-based numerical control system of the invention.

The thin client possesses file transfer function, and many service interactions between the NC device and the server are performed in the file transfer manner, and by taking G code optimization machining as an example (in order to more clearly describe the file transfer manner of the invention, edition of G code is hypothesized to be finished at the local NC device), a typical workflow is shown as FIG. 4:

(1) editing G code at the local NC device and storing G code at the local NC device in a text file manner;

(2) opening the local thin client, logging onto the server from the NC device, and enabling the system desktop of the server to be displayed on HMI in a virtual desktop manner and to cover the NC machining interface;

(3) uploading the G code text file to the server by utilizing the file transfer function integrated on the thin client;

(4) operating the server via the virtual desktop, optimizing G code by utilizing a G code optimization software at the server, and storing the optimized G code at the server in a text file manner;

(5) downloading the optimized G code text file to the NC device also by utilizing the file transfer function integrated on the thin client;

(6) closing the virtual desktop, quitting from the thin client application program, and recovering the NC machining interface of the NC device;

(7) conducting NC machining by the NC device according to the optimized G code.

The thin client is self-adaptive to different screens, in other words, when the client is started, the client automatically adjusts the size of the interface thereof according to the size of the HMI screen for reaching best display effect without influencing the resolution of the system desktop at the server.

The thin client is capable of realizing one-key free switch between the NC machining interface and the virtual desktop without influencing NC machining, can normally run even when a workpiece is machined, and facilitates a user to conduct testing and simulation on a next code segment, workpiece modeling and other operations, thereby improving the machining efficiency of the whole numerical control system.

There is another problem upon setting up a software and hardware environment of the server: on the one hand, a manufacturer will not configure all functional software maybe needed by a user in the future when a product is manufactured, on the other hand, a same user requires different functional software at different stages, and if each user needs a customized specific software environment or any deployment change at the server needs processing by the factory, great inconvenience is brought for users, and also production efficiency of the factory is reduced and after-sales service cost is raised. In order to avoid the above-mentioned problems, the user is assigned with certain server operation authority, so that the manufacturer only needs to configure value added functions (such as G code edition, UG simulation, document editing or document viewing, and the like) at the server for users, the users can expand or cut down software deployed at the server by themselves according to the need, and the operations are essentially performed at the server, do not change any configuration of the local NC device and do not influence the stability of the NC device.

While preferred embodiments of the invention have been described above, it will be obvious to those skilled in the art that the invention is not limited to disclosure in the embodiments and the accompanying drawings. Any modification, equivalent alterations and improvements without departing from the spirit and the principle of the invention fall within the scope of the invention.

What is claimed is:

1. A virtualization-based numerical control (NC) system for controlling NC machining by configuring a remote server and a local NC device and facilitating interaction thereof, said system comprising:

a local NC device operating to process real-time tasks, comprising speed processing, interpolation operation, position control and on-line detection, and to realize human-computer interaction; and a remote server connected with said local NC device, said remote server operating to process non-real-time tasks, comprising G code programming, coding and machining simulation, and to realize value-added functions, comprising one or more value added functions, the value added functions including one or more of document editing or document viewing, Internet browsing, WinSCP file transfer, NC code quality analysis and detection, and NC code spline fitting and optimization; wherein said remote server is connected with said local NC device via a client disposed on said local NC device, and said client operates to conduct virtual operation on said remote server via a human-machine interactive device of said local NC device by using virtualization technology, thereby controlling said remote server on said local NC device, and facilitating NC machining control by cooperation of said remote server and said local NC device.

2. The virtualization-based NC system of claim 1, wherein the process of conducting virtual operation on said remote server via a human-machine interactive device by said client comprises: transmitting an operation interface image corresponding to said remote server to a Human-Machine Interface (HMI), transmitting operation on the operation interface to said remote server in an instruction manner, and transmitting the result to said HMI for updating and displaying after said remote server responds, thereby facilitating localization operation of said remote server.

3. The virtualization-based NC system of claim 2, wherein the process of transmitting and displaying said operation interface image comprises firstly compressing said operation interface image, then transmitting said compressed image to said local NC device based on TCP/IP protocol, and decompressing said compressed image and finally refreshing said HMI according to said decompressed image by said local NC device receiving said decompressed image.

4. The virtualization-based NC system of claim 1, wherein said remote server is a server/PC, a virtual machine running on said server/PC, or a tablet computer.

5. The virtualization-based NC system of claim 1, wherein said remote server can be connected with one or more of a plurality of local NC devices for interaction, NC machining or resource sharing.

6. The virtualization-based NC system of claim 1, wherein functions of said remote server can be one or more of expanded, cut down or configured through said client disposed on said local NC device.

7. The virtualization-based NC system of claim 1, wherein said client is self-adaptive to different screens, and the interface resolution is automatically adjustable according to the screen size of said HMI.

8. The virtualization-based NC system of claim 1, wherein said virtual operation on said remote server on said HMI of said local NC device and workpiece processing by a NC machine may occur simultaneously.

9. A control method for a virtualization-based numerical control (NC) system, said system operating for controlling NC machining by configuring a remote server and a local NC device and facilitating interaction thereof, and said control method comprising:
locally arranging an NC device operating to process real-time tasks, comprising speed processing, interpolation operation, position control and on-line detection, and to realize human-computer interaction; and
remotely arranging a server connecting with said local NC device, said server operating to process non-real-time tasks, comprising G code programming, coding and machining simulation, and to realize value-added functions, comprising one or more value added functions, the value added functions including document editing or document viewing, Internet browsing, WinSCP file transfer, NC code quality analysis and detection, and NC code spline fitting and optimization;
disposing a client on said NC device and running said client, so as to facilitate connection between said server and said NC device via said client disposed on said NC device, conducting virtual operation on said server via a human-machine interactive (HMI) device on said NC device by utilizing virtualization technology, so as to control said server on said local NC device, and further to facilitate NC machining control by cooperation of said server and said local NC device.

10. The control method for a virtualization-based NC system of claim 9, wherein the process of conducting virtual operation on said server via said (HMI) device by said client comprises: transmitting an operation interface image corresponding to said server to the HMI device, transmitting operation on the operation interface to said server in an instruction manner, and transmitting the result to the HMI device for updating and displaying after said server responds, thereby facilitating localization operation of said server.

* * * * *